United States Patent [19]
Sano et al.

[11] Patent Number: 5,189,908
[45] Date of Patent: Mar. 2, 1993

[54] TESTING APPARATUS FOR ENGINE DRIVEN AUTOMOTIVE COMPONENT WITH FEATURE OF PRECISE SIMULATION OF ENGINE TRANSITION STATE

[75] Inventors: Kaoru Sano; Fumio Mizushina; Toshimitsu Maruki, all of Shizuoka; Yukio Naganuma, Tokyo; Takashi Goto, Shizuoka, all of Japan

[73] Assignee: Kabushiki Kaisha Meidensha, Japan

[21] Appl. No.: 618,950

[22] Filed: Nov. 28, 1990

[30] Foreign Application Priority Data

| Nov. 30, 1989 | [JP] | Japan | 1-310881 |
| Nov. 30, 1989 | [JP] | Japan | 1-310884 |
| Nov. 30, 1989 | [JP] | Japan | 1-310885 |
| Nov. 30, 1989 | [JP] | Japan | 1-310890 |

[51] Int. Cl.⁵ ............................................. G01M 19/00
[52] U.S. Cl. .................................................. 73/118.1
[58] Field of Search ................ 73/118.1, 162, 865.9, 73/865.6

[56] References Cited

U.S. PATENT DOCUMENTS

| 3,273,384 | 9/1966 | Flaugher . |
| 4,468,958 | 9/1984 | Takeshita . |
| 4,493,209 | 1/1985 | Takeshita . |
| 4,984,988 | 1/1991 | Mizushina et al. . |

FOREIGN PATENT DOCUMENTS

| 58-38833 | 3/1983 | Japan . |
| 61-53541 | 3/1986 | Japan . |
| 0115738 | 4/1990 | Japan ................................ 73/118.1 |

*Primary Examiner*—Robert Raevis
*Attorney, Agent, or Firm*—Ronald P. Kananen

[57] ABSTRACT

A simulation system for an automotive internal combustion engine is designed for simulating a transition state for varying output torque according to variation of the engine driving condition. The system comprises a power plant which incorporates relatively high inertia, and means for compensating high inertia for achieving low inertia equivalent to the automotive internal combustion engine, an engine characteristics generator receiving predetermined engine operation parameter simulated data for deriving control signal commanding output torque of said power plant according to a predetermined engine output torque variation characteristics which is set in terms of said engine operation parameter simulated data, and means, cooperative with said engine characteristics generator and responsive to a torque variation command demanding said output torque from a first value to a second value, for setting a predetermined torque variation characteristics for varying said control signal value according to an elapsed time so that output torque varies from said first value to said second value within a predetermined torque variation transition period.

19 Claims, 10 Drawing Sheets

TESTING APPARATUS FOR ENGINE DRIVEN AUTOMOTIVE COMPONENT WITH FEATURE OF PRECISE SIMULATION OF ENGINE TRANSITION STATE

BACKGROUND OF THE INVENTION

1. Field of the Invention

The present invention relates generally to a testing apparatus for testing performance of a vehicular component associated with an automotive internal combustion engine, such as a power transmission, a transaxle, a differential gear assembly, and so forth. More specifically, the invention relates to a testing apparatus which employs a high inertia power plant, such as an electric motor, a hydrostatic motor, and so forth.

2. Description of the Background Art

Japanese Patent First (unexamined) Publications (Tokkai) Showa 58-38833 and 61-53541 disclose bench testing systems for automatic power transmission. In the disclosed systems, an electric motor, a hydrostatic motor, and so forth, are employed as substitute power plants in place of an automotive internal combustion engine. As can be appreciated, because of a much higher inertia of the electric motor, hydrostatic motor and other substitute power plants in comparison with the automotive internal combustion engines, the substitute power plant is combined with speed increasing devices. Such automotive engine simulation system is useful for a durability test, a static characteristics test and so forth. However, due to a substantially high inertia moment, it is practically difficult to simulate transition characteristics at transmission speed ratio shifting and so forth. For instance, the electric motor has approximately a 10 times higher inertia magnitude than that of the automotive engine.

For designing automatic power transmissions with enhanced shift feeling, a reduced shift shock and so forth, it is essential to obtain data of transition characteristics of a power plant to be actually combined.

Therefore, Tokkai Showa 61-53541 as identified above, employs a strategy of correction of command current for the electric motor. With the corrected command current, the output torque of the electric motor becomes substantially corresponding to the engine output torque to be output in response to a torque demand. Such approach is generally successful in avoiding an influence of high inertia of the high inertia power plant.

However, due to a much higher inertia of the substitute power plant, such as the electric motor, hydrostatic motor, and so forth substituting for the automotive internal combustion engine than that of the engine, the prior proposed simulation systems are not satisfactory as far as simulation of a engine transition state is concerned. For improving this, co-pending U.S. patent application Ser. Nos. 07/427,031, filed on Oct. 25, 1989, and 436,298 filed on Nov. 13, 1989, now U.S. Pat. No. 4,984,988, issued on Jan. 15, 1991, both of which have been assigned to the common owner of the present invention, propose an engine characteristics simulation system for use in a bench testing apparatus for an automatic power transmission. In the prior proposed system, the engine substituting power plant, such as the electric motor, is combined with a speed increasing device for compensating a high inertia of the electric motor and thereby achieving engine equivalent response characteristics with variation of the output torque.

The simulation system disclosed in the above-identified co-pending U.S. patent applications are successful in general in simulating not only the engine steady state but also an engine transition state. However, in case of the actual automotive internal combustion engine, a transmission shift feeling can be affected by various additional factors. For instance, an active state and an inactive state of a dashpot will cause a fluctuation of the engine output torque and thereby cause a variation of the output of the automatic power transmission. Similarly, the presence and absence of an idle-up condition may cause a variation of an auxiliary air flow through an auxiliary air passage to cause a variation of the engine output. As can be appreciated, in order to perform a precise simulation of an engine activity, it is required to control operation of the power plant depending upon factors affecting engine output.

SUMMARY OF THE INVENTION

In view of the drawback in the prior art, it is an object of the present invention to enable a precise simulation of engine transition characteristics according to various engine operational parameters.

According to one aspect of the invention, a simulation system for an automotive internal combustion engine comprises:

a power plant which incorporates a relatively high inertia, and means for compensating the high inertia for achieving a low inertia equivalent to the automotive internal combustion engine;

an engine characteristics generator receiving predetermined engine operation parameter simulated data for deriving a control signal commanding an output torque of the power plant according to a predetermined engine output torque variation characteristic which is set in terms of the engine operation parameter simulated data; and means, cooperative with the engine characteristics generator and responsive to a torque variation command demanding the output torque from a first value to a second value, for setting a predetermined torque variation characteristics for varying the control signal value according to an elapsed time so that output torque varies from the first value to the second value within a predetermined torque variation transition period.

The torque variation characteristics may be variable depending upon a simulated engine driving condition as defined by the predetermined engine operation parameter. Preferably, the torque variation characteristics setting means sets the torque variation characteristics simulating a transition upon shifting of an automotive power transmission. In such case, the torque variation characteristics setting means may be active in response to initiation of shifting of the automotive power transmission. The torque variation characteristics setting means may detect a shifting of the automotive power transmission based on a variation of a ratio of an input-/output revolution speed at the transmission.

Alternatively, the torque variation characteristics setting means may detect satisfaction of a predetermined shift condition of the automotive power transmission and becomes active upon expiration of a given first period after detection of satisfaction of the shift condition and inactive after expiration of a given second period after detection of satisfaction of the shift condition. In the further alternative, the torque variation characteristics setting means varies torque variation characteristics depending upon an active state and an inactive state of idle-up. In such case, the torque variation characteristics setting means detects satisfaction of a predetermined idle-up condition to switch the torque variation characteristics from a first characteristic for an idle-up inactive state to a second characteristic for an idle-up active state. The torque variation characteristics setting means may be responsive to an acceleration and deceleration demand simulated data for setting torque variation characteristics for simulating torque variation during engine accelerating and decelerating transition.

According to another aspect of the invention, a bench testing apparatus for a vehicular component driven by an output of an automotive internal combustion engine, comprises:

a power plant which incorporates relatively high inertia, and means for compensating the high inertia for achieving a low inertia equivalent to the automotive internal combustion engine, the power plant being drivingly connected to the vehicular component to be tested for supplying a driving torque;

an engine characteristics generator receiving a predetermined engine operation parameter simulated data for deriving a control signal commanding an output torque of the power plant according to a predetermined engine output torque variation characteristics which is set in terms of the engine operation parameter simulated data; and means, cooperative with the engine characteristics generator and responsive to a torque variation command demanding the output torque from a first value to a second value, for setting a predetermined torque variation characteristic for varying the control signal value according to an elapsed time so that output torque varies from the first value to the second value within a predetermined torque variation transition period.

BRIEF DESCRIPTION OF THE DRAWINGS

The present invention will be understood more fully from the detailed description given herebelow and from the accompanying drawings of the present invention, which, however, should not be limited to the specific embodiments, but are for explanation and understanding only.

In the drawings.

DESCRIPTION OF THE PREFERRED EMBODIMENT

Figure 1:
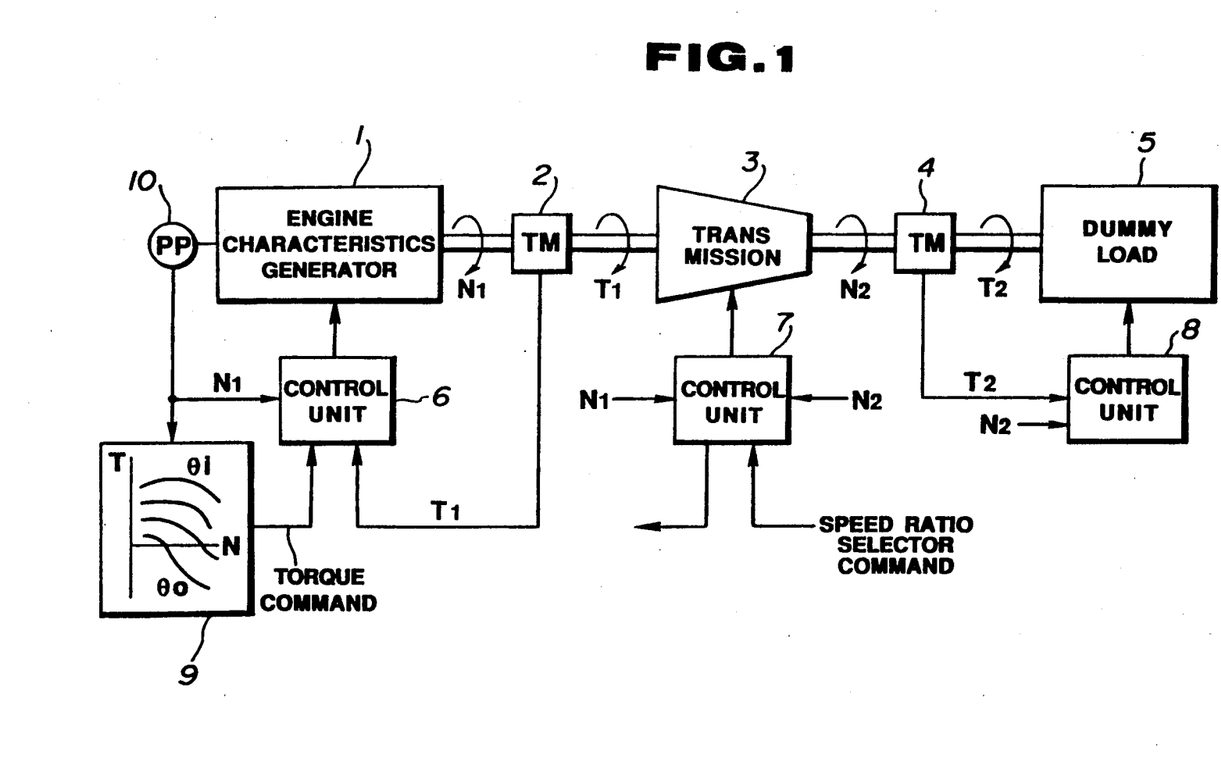
FIG. 1 is a block diagram of the preferred embodiment of a bench testing apparatus with an engine characteristics generator, according to the invention.

Referring now to the drawings, particularly to FIG. 1, there is illustrated a dynamometer for bench testing an automotive automatic power transmission utilizing the preferred embodiment of an automotive engine simulation system according to the invention. The shown embodiment of the automatic power transmission employs a low inertia power plant 1. The low inertia power plant 1 comprises a direct current motor which is associated with a thyristor-Leonard type current control minor loop. The direct current motor may be further associated with a speed increasing device for compensating high inertia of the direct current motor. The motor is controlled by a current command or a torque command generated by the thyristor-Leonard type minor loop. The low inertia power plant has been disclosed in the co-pending U.S. patent application Ser. Nos. 07/427,031 filed on Oct. 25, 1989, and 07/436,298 filed on Nov. 13, 1989 now U.S. Pat. No. 4,984,908 issued on Jan. 15, 1991. The disclosure of the above-identified co-pending U.S. patent application is herein incorporated by reference for the sake of disclosure.

The low inertia power plant 1 has an output shaft which is connected to an automatic power transmission 3 to be tested. Therefore, the automatic power transmission 3 is driven by the output of the low inertia power plant 1. The output shaft of the automatic power transmission 3 is connected to a dummy load 5 via a torque meter 4. As the dummy load 5, a torque absorbing dynamometer 5 including a flywheel is utilized.

For controlling the low inertia power plant 1, the automatic power transmission 3 and the dynamometer 5, respectively separate control units 6, 7 and 8 are provided. For the control unit 6, a torque command or a speed command is applied for performing torque or speed control. The control unit 6 also receives a torque indicative signal $T_1$ representative of the output torque of the low inertia power plant 1 from the torque meter 2. Therefore, the control unit 6 performs feedback control of the low inertia power plant by supplying a torque control signal which adjusts the output torque to reduce the difference between the commanded torque indicated in the torque command and the actual output torque indicated in the torque indicative signal $T_1$.

The torque command is generated by the preferred embodiment of an engine characteristics torque command generator 9, according to the invention. The engine characteristics generator 9 comprises a microprocessor based unit. The engine characteristics generator 9 sets a output torque characteristics in relation to a revolution speed N. The output torque characteristics are set relative to respective throttle valve open angle $\theta_i$. Respectively output torque characteristics may be set through experiments. The engine characteristics generator 9 processes the throttle valve open angle data $\theta_i$ and a revolution speed indicative data N which is supplied from a revolution speed sensor 10. On the basis of the throttle valve open angle data $\theta_i$ and a revolution speed indicative data N, the torque command value is derived according to the set output torque characteristics of FIG. 3.

It should be appreciated that, though the shown embodiment employs the throttle valve open angle data $\theta_i$ as an engine load indicative data, an intake air vacuum pressure can be utilized.

Figure 2:
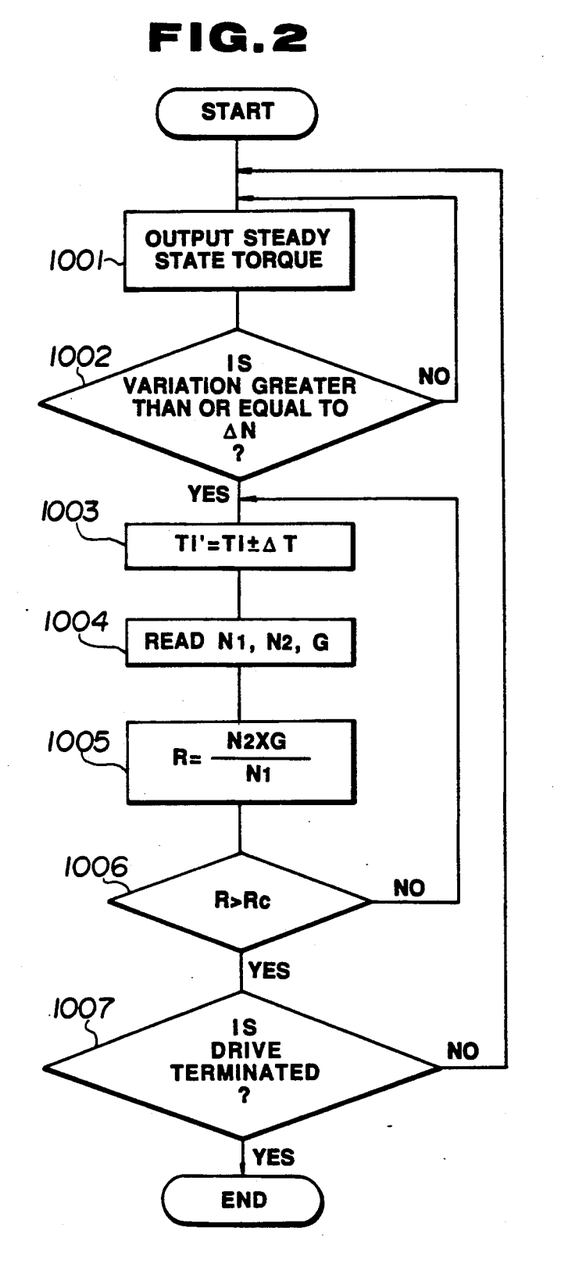
FIG. 2 is a flowchart showing a first preferred process of simulation of engine operation during an engine transition state.

FIG. 2 is a flowchart showing process of operation to be performed by the engine characteristics generator 9 for simulating a transmission gear ratio shifting transition. At a step 1001, a steady state engine driving condition indicative parameter data respectively representing an engine speed $N_1$ and a throttle valve open angle $\theta_1$, are output. Based on these steady state engine driving condition indicative parameter data, the torque command $T_i$ is output from the control unit 6 for controlling the low inertia power plant 1. Therefore, the low inertia power plant 1 is driven at a steady state in a condition defined by the engine speed indicative parameter data $N_1$ and the throttle valve open angle indicative parameter data $\theta_1$. While the low inertia power plant 1 is driven at the steady state, the engine characteristics generator 9 monitors variation of the output revolution speed $N_1$ of the low inertia power plant. The engine characteristics generator 9 thus checks whether a variation of the output revolution speed of the low inertia power plant 1 becomes greater than a predetermined speed ratio shifting transition criterion $\pm\Delta N$ at a step 1002. If the output revolution speed variation becomes greater than or equal to $\pm\Delta N$, judgement is made that the engine is in the shifting transition state. Until the engine shifting transition state is detected at the step 1002, the steady state engine driving condition indicative parameter data $N_1$ and $\theta_1$ is maintained constant for driving the low inertia power plant 1 in the steady state. On the other hand, if the engine shifting transition state is detected at the step 1002, the engine characteristics generator 9 outputs a modified torque command $T_i'$ which is derived by adding or subtracting a predetermined torque variation value $\Delta T$, which may be set with respect to the actual engine speed variation characteristics in relation to the automatic power transmission to be tested, the magnitude of values of the engine speed indicative parameter data $N_1$ and the throttle valve open angle indicative parameter data $\theta_i$, instantaneous timing in the shifting transition period, and the transmission speed ratios to be shifted, to or from the the steady state torque command value $T_i$, at a step 1003. Namely, when the variation of the output revolution speed is caused to decrease the revolution speed which represents a shifting up of the transmission speed ratio, the predetermined torque variation value $\Delta T$ is subtracted from the steady state torque command value $T_i$. On the other hand, when the output revolution speed is increased beyond the speed ratio shifting transition criterion to represent a shifting down of the transmission speed ratio, the predetermined torque variation value $\Delta T$ is added to the steady state torque command value $T_i$.

After modifying the torque command to $T_i'$ at the step 1003, the input speed which corresponds to the output revolution speed $N_1$ and an output speed $N_2$ of the automatic power transmission 3 and G representative of the selected speed ration range, are cyclically or periodically read out, at a step 1004. At the step 1004, a current speed ratio range of the automatic power transmission 3 is also read out periodically. Based on these read data, an input/output speed ratio R is arithmetically calculated at a step 1005 based on the following equation:

$$R = \frac{N_2 \times G}{N_1}$$

Thereafter the input/output speed ratio R is compared with a predetermined input/output speed ratio criterion $R_c$ at a step 1006. When, the input/output speed ratio R is smaller than the input/output speed ratio criterion $R_c$, judgement is made that shifting of the transmission speed ratio is not yet complete. In such case, the process at the steps 1003 to 1006 is repeated. On the other hand, when the input/output speed ratio R becomes greater than or equal to the input/output speed ratio criterion $R_c$, then judgement can be made that shifting of the transmission speed ratio is completed.

When completion of the transmission speed ratio is detected at the step 1006, a check is made whether driving of the low inertia power plant 1 is terminated, at a step 1007. If not, the process returns to the step 1001 to drive the low inertia power plant at the steady state.

As can be appreciated, according to the shown embodiment of the process, engine characteristics at the automatic power transmission speed ratio shifting transition can be successfully simulated.

Figure 3:
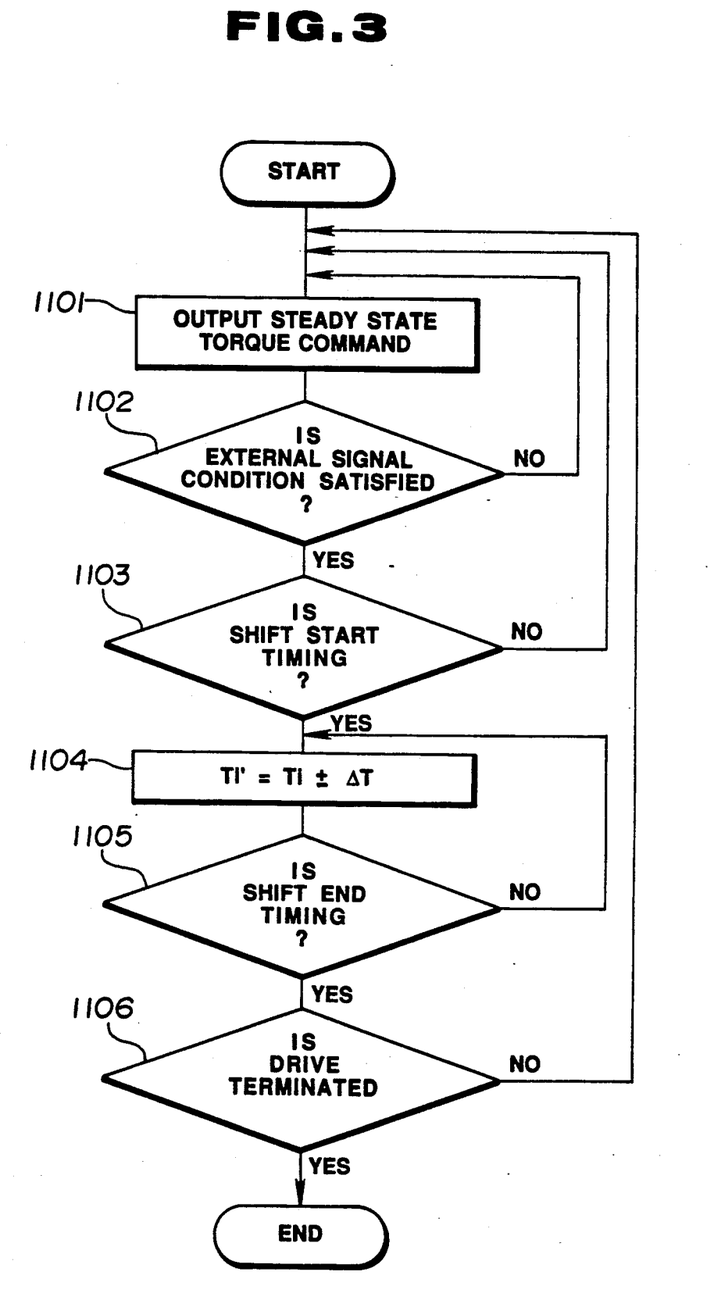
FIG. 3 is a flowchart showing a second preferred process of simulation of engine operation during a shifting transition of a power transmission.

FIG. 3 is a flowchart of the second preferred process in simulating the engine transition characteristics. The shown embodiment features detection of transmission speed ratio shifting start timing and end timing based on the external signal conditions. Therefore, at a step 1101, a steady state engine driving condition indicative parameter data respectively representing an engine speed $N_1$ and a throttle valve open angle $\theta_1$, are output. Based on these steady state engine driving condition indicative parameter data, the torque command $T_i$ is output from the control unit 6 for controlling a low inertia power plant 1. Therefore, the low inertia power plant 1 is driven at a steady state in a condition defined by the engine speed indicative parameter data $N_1$ and the throttle value open angle indicative parameter data $\theta_1$. While the low inertia power plant 1 is driven at the steady state, the signal states of one or more external signals, such as a shifting command for automatic power transmission from the control unit 7 or so forth, are checked at a step 1102. Until the signal state of the external signal indicates the transmission speed ratio shifting transition state, steps 1101 and 1102 are repeated to maintain driving of the low inertia power plant 1 at a steady state. When the signal state varies, a transmission speed ratio shift transition state is detected at the step 1102, then a check is performed at a step 1103 whether a transmission speed ratio shifting is actually initiated or not. Monitoring an actual shift start timing may be done by monitoring a variation of the output speed $N_1$ of the low inertia power plant 1 as discussed in the former preferred process in FIG. 2. Otherwise, initiation of transmission speed ratio shifting may be detected by monitoring a variation of a transmission operational range indicative signal. While initiating an actual initiation of the transmission speed ratio shifting, the process of the steps 1101 to 1103 are repeated. On the other hand, though the foregoing discussion monitors actual operation of the automatic power transmission to detect initiation of transmission speed ratio shifting, it may also be possible to simply give a predetermined delay time corresponding to lag timing of actual initiation of an transmission speed ratio shifting to make a judgment that transmission speed ratio shifting is initiated upon expiration of the predetermined delay time.

When initiation of transmission speed ratio shifting is detected at the step 1103, the engine characteristics generator 9 outputs a modified torque command $T_i'$ which is derived by adding or subtracting a predetermined torque variation value $\Delta T$, which may be set with respect to the actual engine speed variation characteristics in relation to the automatic power transmission to be tested, the magnitude of values of the engine speed indicative parameter data $N_1$ and the throttle valve open angle indicative parameter data $\theta_i$, instantaneous timing in the shifting transition period, and the transmission speed ratios to shifted, to or from the steady state torque command value $T_i$, at a step 1104. Namely, when the variation of the output revolution speed is caused to decrease the revolution speed which represents shifting up of the transmission speed ratio, the predetermined torque variation value $\Delta T$ is subtracted from the steady state torque command value $T_i$. On the other hand, when the output revolution speed is increased beyond the speed ratio shifting transition criterion to represent a shifting down of the transmission speed ratio, the predetermined torque variation value $\Delta T$ is added to the steady state torque command value $T_i$. Upon starting of the output of the modified torque command $T_i'$ at the step 1103, an elapsed time is started to be measured. Measurement of the elapsed time is continued until the measured elapsed time reaches a predetermined transmission speed ratio shifting period. Therefore, at a step 1105, the measured elapsed time is compared with a predetermined shifting transition period criterion. Therefore, until the measured elapsed time becomes greater than or equal to the predetermined shifting transition period criterion as checked at the step 1104, the process at the step 1104 is repeated. When the measured elapsed time reaches the shifting transition period criterion, a check is performed at a step 1106 whether driving of the low inertia power plant 1 is terminated or not. If driving of the inertia power plant 1 is terminated, the process goes to an END and otherwise returns to the step 1101 to drive the low inertia power plant in a steady state.

With this process, equivalent advantages of precise simulation of engine transition characteristics can be achieved.

Figure 4:
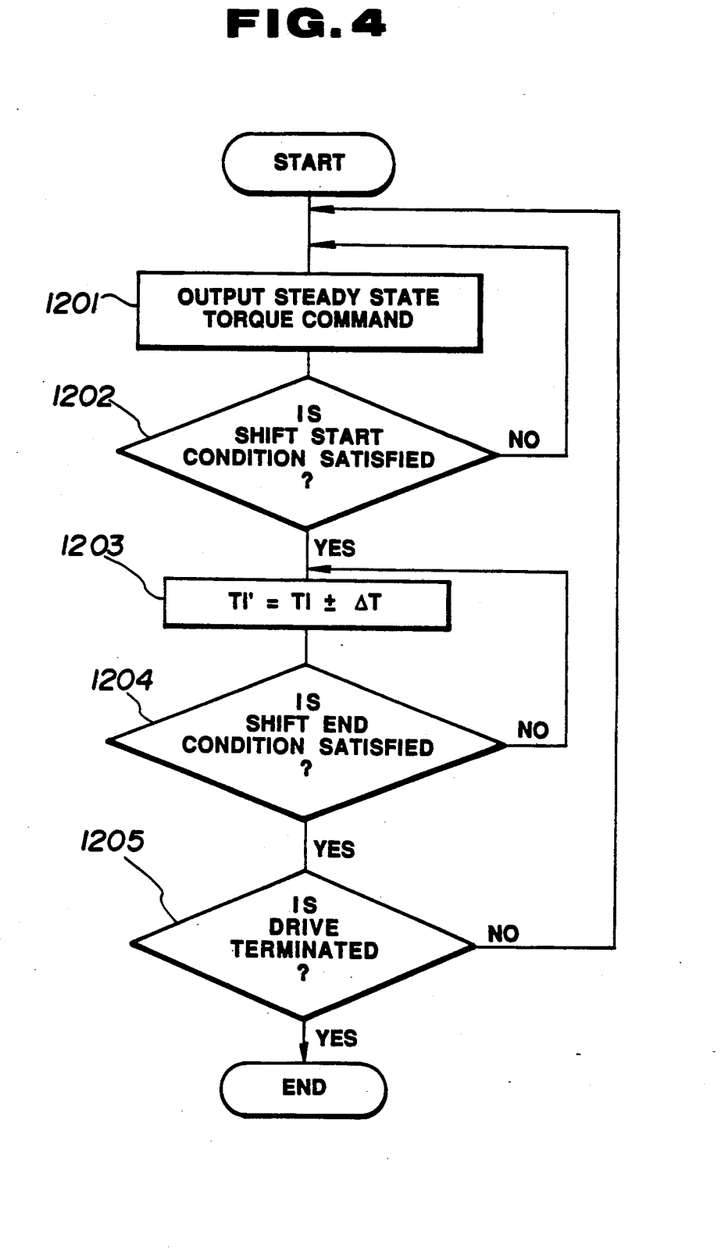
FIG. 4 is a flowchart showing a third preferred process of simulation of engine operation during a shifting transition of a power transmission.

FIG. 4 shows the third preferred process of the engine characteristics simulation to be performed in the preferred embodiment of the engine characteristics generator according to the invention. In the shown process, features are shown for detection of a transmission speed ratio shifting transition on the basis of a combination of the inputs for the engine characteristics generator 9. At the initial step 1201, steady state engine driving condition indicative parameter data respectively representing an engine speed $N_1$ and a throttle valve open angle $\theta_1$, are output. Based on these steady state engine driving condition indicative parameter data, the torque command $T_i$ is output from the control unit 6 for controlling low inertia power plant 1. Therefore, the low inertia power plant 1 is driven at a steady state in a condition defined by the engine speed indicative parameter data $N_1$ and the throttle valve open angle indicative parameter data $\theta_1$. Subsequently, at a step 1202, input signals $N_1$ representative of the input revolution speed of the automatic power transmission, $N_2$ representative of the output revolution speed of the automatic power transmission, and G representative of the selected speed ratio range, are read output. At the step 1202, the check is performed whether a combination of inputs for the engine characteristics generator 9 satisfies a predetermined transmission speed ratio shifting condition. While the combination of the inputs does not satisfy the predetermined transmission speed ratio shifting condition, the low inertia power plant 1 is driven at the steady state as controlled through the steps of 1201 and 1202. On the other hand, when the predetermined transmission speed ratio shifting condition is satisfies as checked at the step 1202, the engine characteristics generator 9 outputs a modified torque command $T_i'$ which is derived by adding or subtracting a predetermined torque variation value $\Delta T$, which may be set with respect to the actual engine speed variation characteristics in relation to the automatic power transmission to be tested, the magnitude of values of the engine speed indicative parameter data $N_1$ and the throttle valve open angle indicative parameter data $\theta_i$, instantaneous timing in the shifting transition period, and the transmission speed ratios to shifted, to or from the steady state torque command value $T_i$, at a step 1204. Namely, when the variation of the output revolution speed is caused to decrease the revolution speed which represents shifting up of the transmission speed ratio, the predetermined torque variation value $\Delta T$ is subtracted from the steady state torque command value $T_i$, at a step 1203. On the other hand, when the output revolution speed is increased beyond the speed ratio shifting transition criterion to represent shifting down of the transmission speed ratio, the predetermined torque variation value $\Delta T$ is added to the steady state torque command value $T_i$.

In a similar manner to that set forth above, the engine characteristics generator 9 checks whether a transmission speed ratio shifting period is ended by checking whether the combination of the inputs thereof satisfies a predetermined transmission speed ratio shifting terminating condition, at a step 1204. Until the transmission speed ratio shifting terminating condition is satisfied, the process at the step 1203 is repeatedly or cyclically performed. When satisfaction of the terminating condition is detected, a check is performed whether the drive of the low inertia power plant 1 is terminated or not, at a step 1205. If YES, the process goes to an END, and is otherwise returned to the step 1201 to drive the low inertia power plant at the steady state.

Figure 5:
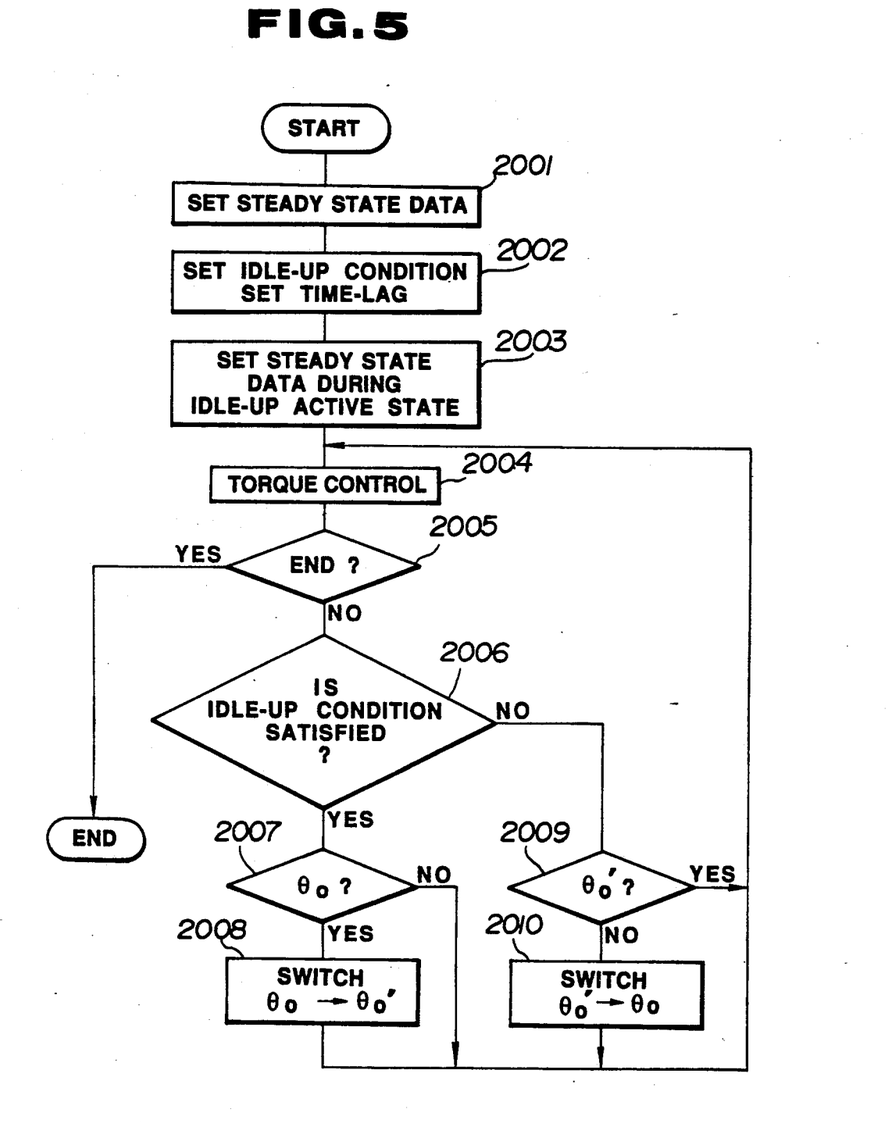
FIG. 5 is a flowchart showing a fourth preferred process of simulation of engine operation depending upon idle-up condition.

FIG. 5 shows the fourth preferred process to be executed by the engine characteristics generator in the preferred embodiment of the engine characteristics simulation system, according to the invention. The shown embodiment is directed for simulating transition between an idle-up active state and an idle-up inactive state.

Figure 6:
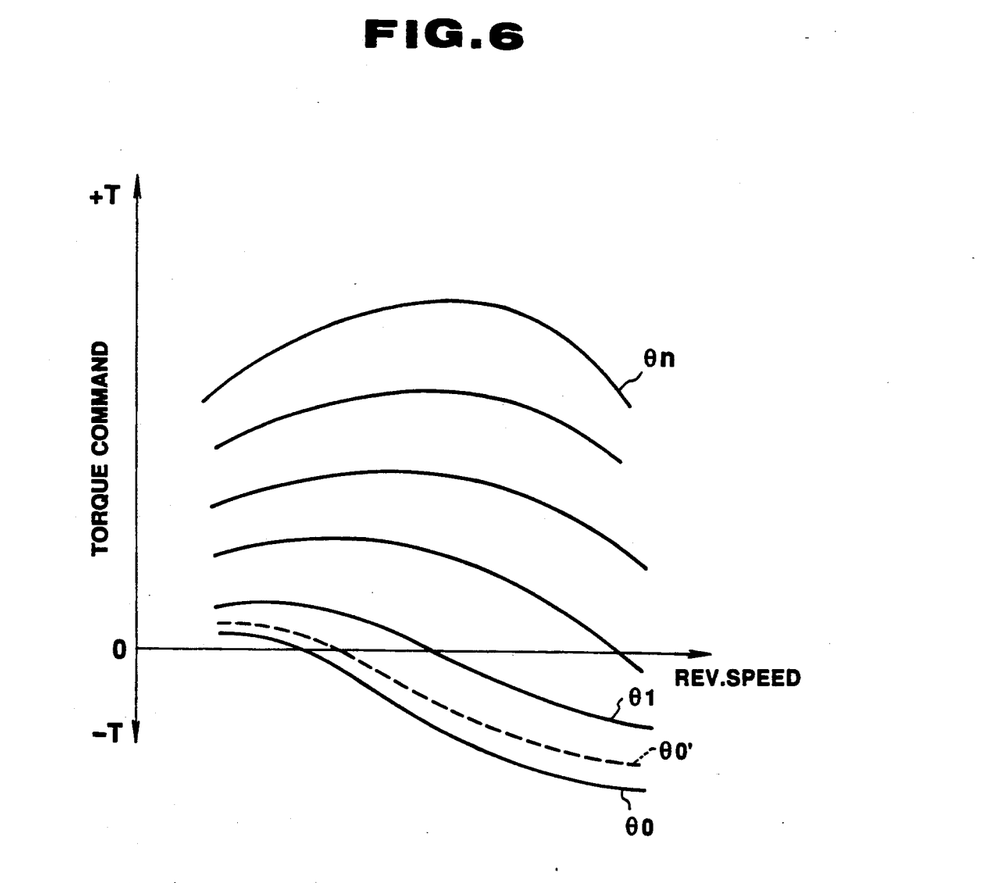
FIG. 6 is a chart showing engine output torque variation characteristics in the fourth preferred process of simulation of engine operation.

In the shown embodiment, steady state engine driving parameter indicative data are set at a step 2001. As can be seen, in the shown embodiment, variation characteristics of the torque command are set in terms of the revolution speed of the low inertial power plant 1 and the throttle valve open angle $\theta_0$ to $\theta_n$ as shown in FIG. 6. Then, a predetermined idle-up condition is set and lag time $T_2$ from satisfaction of the idle-up condition to actual increasing of the revolution speed is set, at a step 2002. For instance, in the actual automotive engine, idle-up becomes active in response to a transmission operational range selector operation from P (parking) range or N (neutral) range to forward or reverse driving range, e.g. D (drive=automatic shifting), turning ON of an air conditioner, a lower battery voltage, and so forth. Therefore, the predetermined idle-up condition is set to simulate one or more of the idle-up conditions. On the other hand, the lag time $T_2$ may be set in view of the lag time of an initiation of an idle-up state operation from satisfaction of the idle-up condition. Then, the steady state engine output torque variation characteristics $Q_0'$ at the idle-up active state is set at a step 2003. Thereafter, torque control is performed by producing the torque control command on the basis of the steady state engine driving parameter indicative data, at a step 2004. At a step 2005, a check is performed whether driving of the low inertia power plant 1 is terminated or not. If YES, the process goes to an END. On the other hand, if the low inertia power plant 1 continues driving, check is performed whether the set idle-up condition is satisfied or not, at a step 2006. If satisfaction of the idle-up condition is detected as checked at the step 2006, the throttle value open angle indicative data is checked whether it represents $\theta_0$, at a step 2007. If so, the throttle valve open angle indicative data is switched to $\theta_0'$ at a step 2008. At this time, a delay time corresponding to the lag time $T_2$ set at the step 2002 can be provided for simulating a time lag for effecting an idle-up in the actual engine. On the other hand, when the idle-up condition is not satisfied as checked at the step 2006, the throttle valve open angle indicative data is checked whether it represents the modified throttle valve open angle $\theta_0'$ at a step 2009. In case that the throttle valve open angle indicative data is $\theta_0'$ as checked at the step 2009, the value is switched from $\theta_0'$ to $\theta_0$, at a step 2010.

As can be appreciated, a condition satisfying the preset idle-up condition may be supplied as a simulation signal provided as an external signal.

Figure 7:
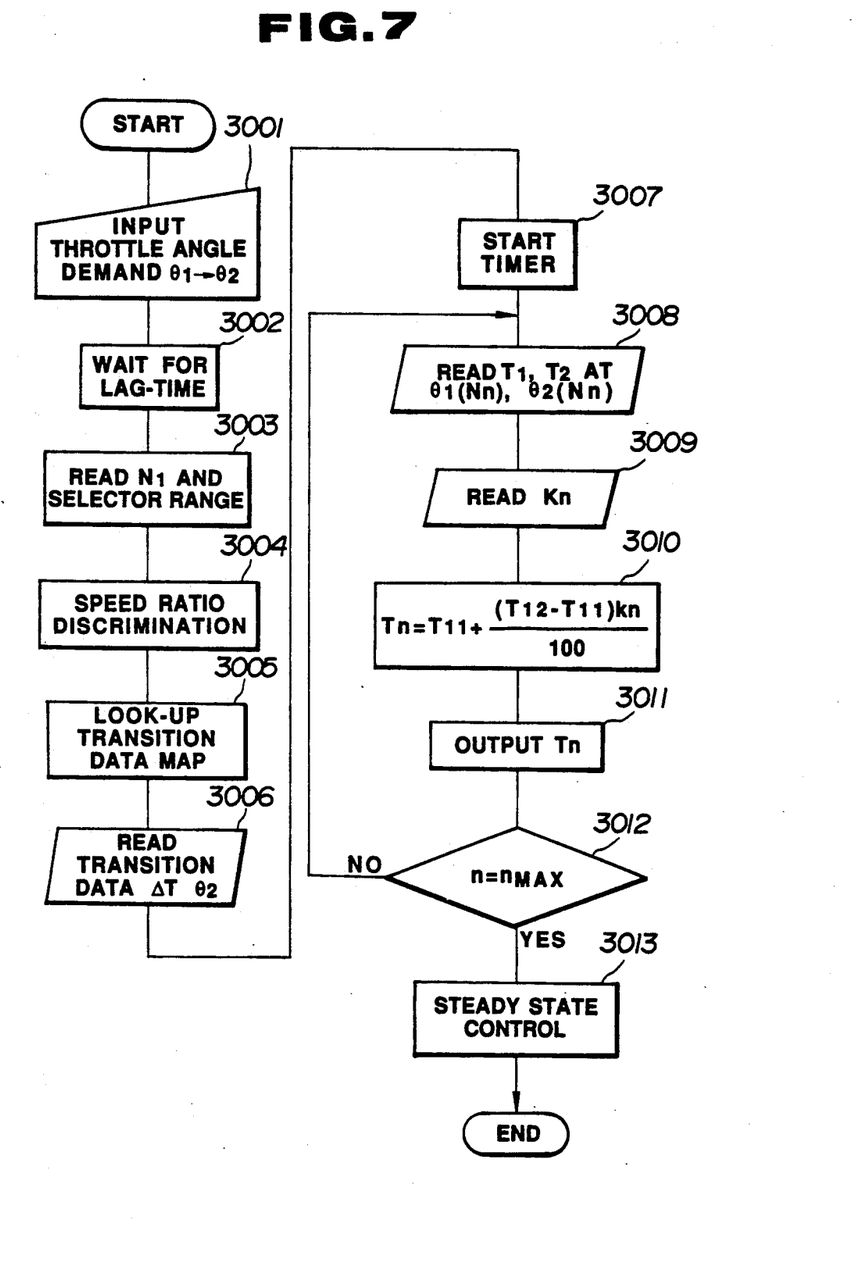
FIG. 7 is a flowchart showing a fifth preferred process of simulation of engine operation in a transition state.

FIG. 7 shows the fifth preferred process to be executed by the preferred embodiment of the engine operation simulating system according to the present invention. The shown embodiment is designed for simulating an engine accelerating and decelerating transition state in response to variation of the throttle valve open angle. It should be appreciated that though the shown embodiment does not illustrate in a positive fashion, the step 1001 in the first preferred process is performed in the normal state for driving the low inertia power plant 1 in the steady state. For control of steady state driving of the low inertia power plant 1, constant values of the engine speed indicative data $N_1$ and the throttle valve open angle indicative signal $\theta$ are provided.

In order to simulate the engine acceleration and deceleration transition state, throttle valve open angle indicative data varying the value from an initial value $\theta_1$ to a modified value $\theta_2$ is entered at a step 3001. Then, a predetermined lag time which corresponds to an actual lag in accelerating and decelerating an engine in response to a throttle valve open angle variation, is given at a step 3002. In practice, the lag time may be set for a period derived experimentarily or structurally in view of a mechanical lag in the linkage system and so forth.

After expiration of the preset lag time, the engine speed indicative data $N_1$ and an automatic power transmission selector range indicative data are read out at a step 3003. Based on read data, the current transmission speed ratio is discriminated at a step 3004. Thereafter, torque variation transition characteristics are derived by way of map look-up in terms of the engine speed indicative data $N_1$, the selector range, transmission speed ratio, the initial and modified throttle valve open angle data $\theta_1$ and $\theta_2$, at a step 3005. In practice, one of a plurality of transition characteristics is selected. Then, based on the selected transition characteristics, transition response indicative data corresponding to the modified throttle valve open angle data $\theta_2$ is derived at a step 3006.

Figure 8:
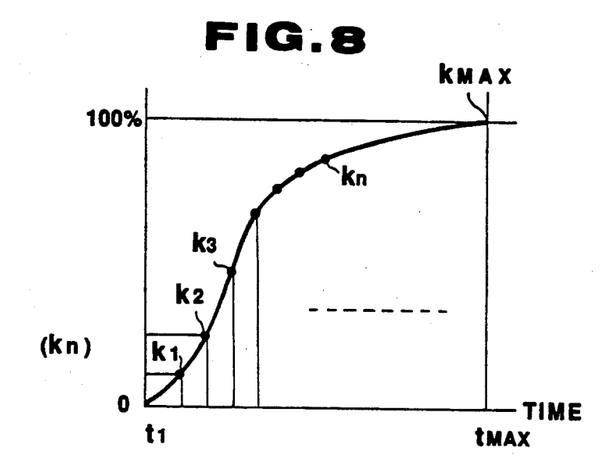
FIG. 8 is a chart showing a relationship between a torque output ratio and an occurrence.

After the step 3006, timer for measuring elapsed time is started at a step 3007. The measured elapsed time is utilized for arithmetic operation for deriving torque command value. Then, at a step 3008, torque command values $T_{11}$ and $T_{12}$ at the current driving condition are defined by the throttle value open angle data $\theta_1$ ($N_1$) and $\theta_2$ ($N_1$). Then, at a step 3009, a torque ratio data $k_n$ is read out. The torque ratio data defines torque variation transition characteristics defining a ratio of torque variation at the instantaneous timing during the torque variation transition period, as shown in FIG. 8. Namely, as can be clear from FIG. 8, a torque variation rate $k_n$ varies to $k_1$, $k_2$, $k_3$ ... depending upon elapsed time. In FIG. 8, $t_{max}$ represents predetermined torque variation terminating timing. The torque variation characteristics are so set as to become $k_{max}$(100%) at $t_{max}$. Utilizing the torque variation ratio $k_n$ at the instantaneous timing, an instantaneous torque command value $T_n$ is derived from the following equation, at a step 3010:

$$T_n = T_{11} \pm \frac{(T_{12} - T_{11}) \cdot k_n}{100}$$

Then, at a step 3011, the torque command having the value $T_n$ is output. Thereafter, a timer value n is compared with a timer criterion $n_{max}$ which defines the maximum torque variation transition period $t_{max}$ in FIG. 8, at a step 3012. When the timer value n is smaller than the timer criterion $n_{max}$ as checked at the step 3012, judgement is made that the current status is still within the torque variation transition state. In such case, the process returns to the step 3008 to repeat operation for periodically deriving the torque command value $T_n$. On the other hand, when the timer value n becomes greater than or equal to the timer criterion $n_{max}$, judgement can be made that the torque variation transition period is over. In such case, the process goes to a step 3013 to return the steady state control.

Figure 9:
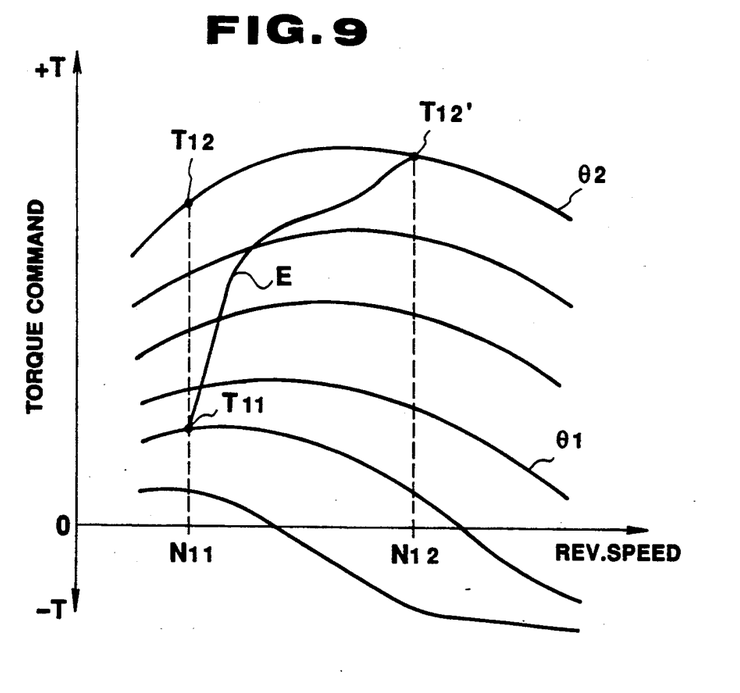
FIG. 9 is a chart showing the engine output torque variation characteristics in the fifth preferred process of simulation of the engine operation.

As can be appreciated, the torque variation transition characteristics can be set in terms of the input parameters at the step 3005, and precise simulation of engine acceleration and deceleration transition can be done. Namely, as can be seen from FIG. 9, output torque variation as illustrated by line E which substantially correspond to output torque variation in the actual automotive engine during engine accelerating transition can be simulated.

Figure 10:
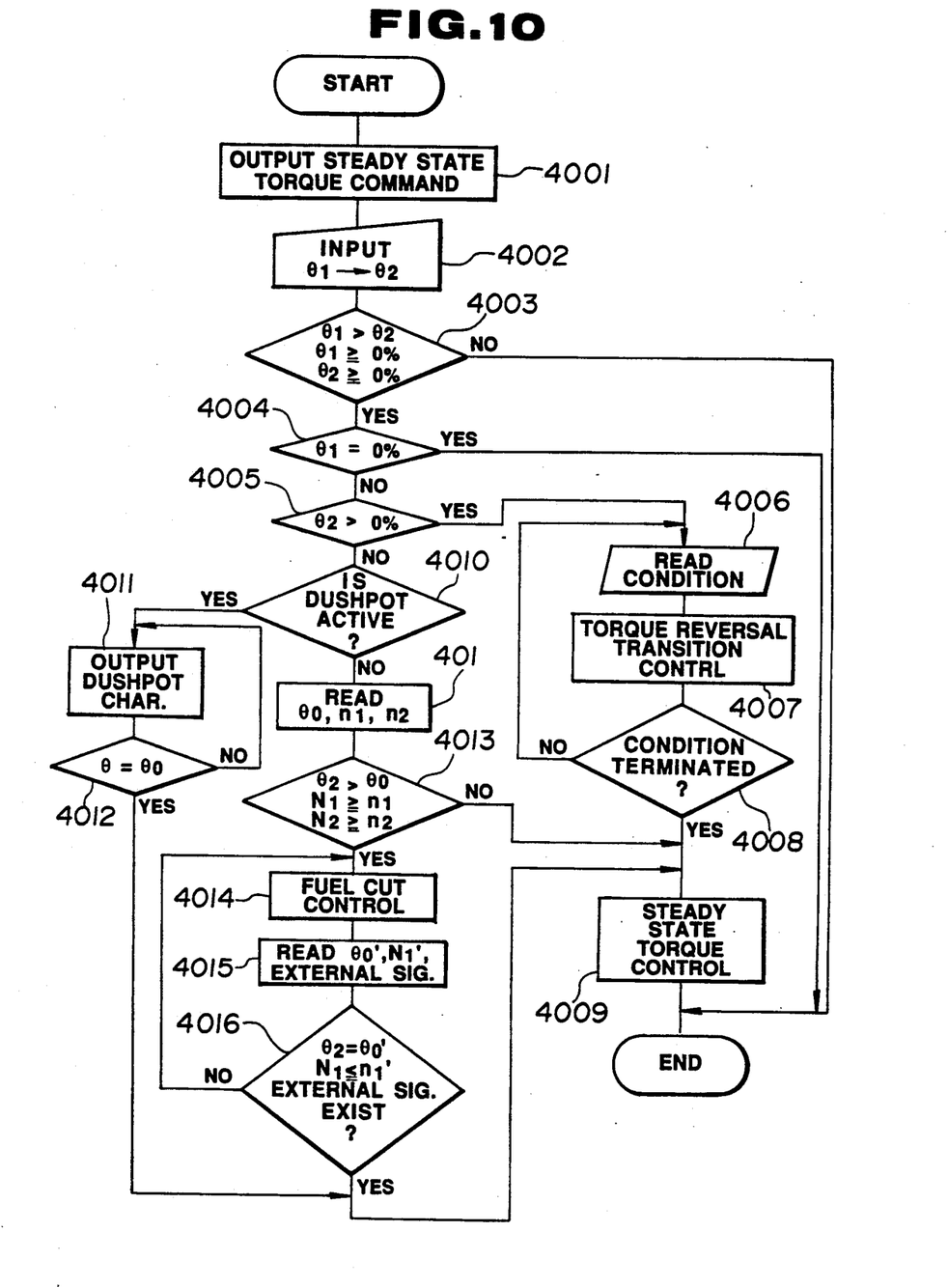
FIG. 10 is a flowchart showing a sixth preferred process of an simulation of engine operation depending upon an active state and an inactive state of a dashpot.

FIG. 10 shows a process in the sixth preferred process of engine characteristics simulation to be performed by the preferred embodiment of the engine operating characteristics simulation system according to the invention for simulating an automotive internal combustion engine with a dashpot.

At a step 4001, a steady state torque command is derived on the basis of the steady state input data, i.e. engine speed indicative data $N_1$ and the throttle valve open angle data $\theta$, and to output the torque command for driving the low inertia power plant in a steady state. Thereafter, an initial throttle valve open angle data $\theta_1$ and a modified throttle valve open angle data $\theta_2$ are input at a step 4002. Then, at a step 4003, a check is performed whether the initial throttle valve open angle data $\theta_1$ greater than the modified throttle valve open angle data $\theta_2$, the initial throttle valve open angle data $\theta_1$ is greater than or equal to 0% and the modified throttle valve open angle data $\theta_2$ is greater than or equal to 0%. As can be appreciated, the shown process is intended to simulate an engine transition state during an engine deceleration period in response to reduction of the throttle valves open angle from $\theta_1$ to $\theta_2$. If an AND condition of the aforementioned three conditions is not established, the process directly goes to an END. On the other hand, when an AND condition is established as checked at the step 4003, a check is performed whether the initial throttle valve open angle data represents 0% of the throttle valve open angle, at a step 4004. If so, the process also goes to an END. On the other hand, if the initial throttle valve open angle $\theta_1$ as checked at the step 4004 is greater than 0%, a check is performed whether the modified throttle valve open angle data $\theta_2$ is greater than zero at a step 4005.

Figure 12:
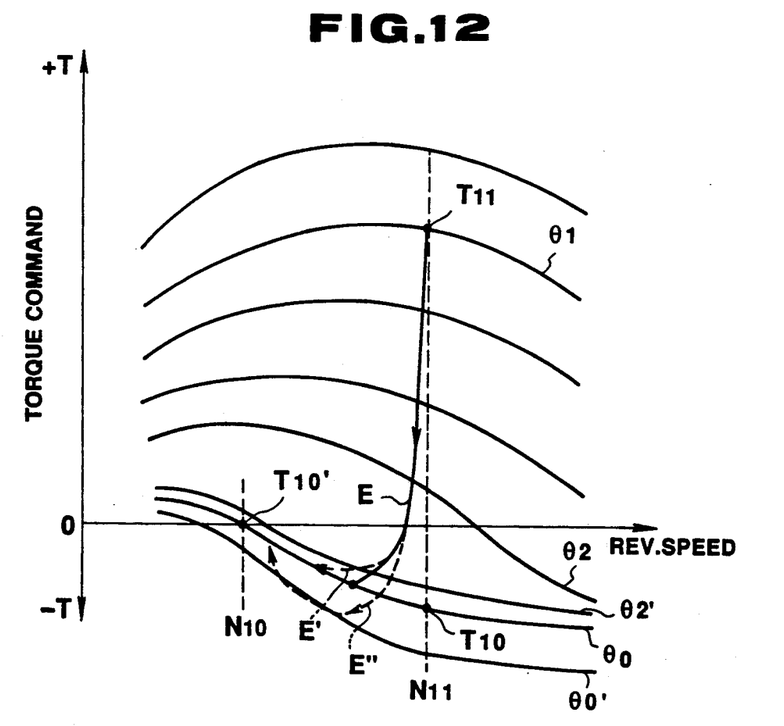
FIG. 12 is a chart showing the engine output torque variation characteristics in the sixth preferred process of simulation of the engine operation.

When the modified throttle valve open angle data $\theta_2$ as checked at the step 4005 is greater than 0%, the engine driving condition indicative parameters $N_1$, $\theta_1$ and $\theta_2$ are read out at a step 4006 as engine operating condition simulating data. Furthermore, at the step 4006, an engine deceleration transition characteristics is read out in terms of the engine driving condition indicative parameters. The characteristics thus derived at the step 4006 correspond to the output torque variation characteristics as illustrated by line E in FIG. 12. The engine deceleration characteristics may be set in terms of the initial output speed, the initial and modified throttle valve open angles, and so forth, to define variation of the output torque from the initial output torque corresponding to the initial throttle valve open angle $\theta_1$ to the modified torque corresponding to the modified throttle valve open angle $\theta_2$. The engine deceleration transition characteristics includes torque variation ratios at respective timing in the engine deceleration transition period. Such torque variation ratio employed in the shown preferred process corresponds to the variation ratio $k_n$ in the former process of FIG. 7. Utilizing the engine deceleration transition characteristics derived at the step 4006, output torque reduction (reversal) transition control is performed at a step 4007 to decrease the output torque toward the output torque at the throttle valve open angle $\theta_2$. Then, a check is performed whether the deceleration transition period is over or not at a step 4008. If the answer is negative, the processes of the steps 4006, 4007 and 4008 are periodically performed until the answer at the step 4008 becomes positive. When the answer at the step 4008 becomes positive, and thus judgement can be made that the deceleration transition state ends, then steady state control is performed at a step 4009.

Figure 11:
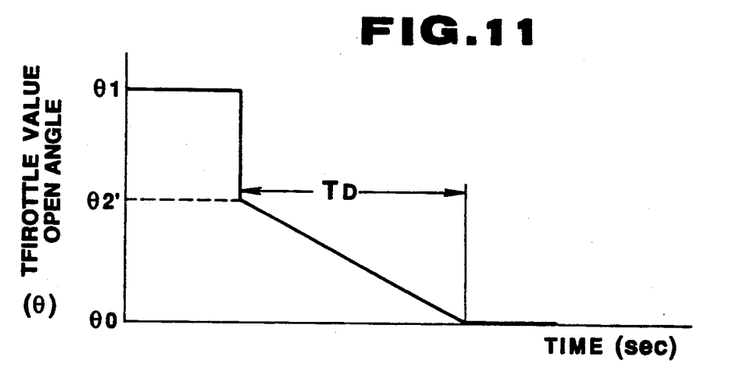
FIG. 11 is a chart showing characteristics of a dashpot.

On the other hand, when the modified throttle valve open angle data $\theta_2$ as checked at the step 4005 is equal to 0%, a check is performed whether a dashpot is active or not at a step 4010. If the dashpot is active, a output torque modified according to a predetermined dashpot characteristics as illustrated in FIG. 11 is output at a step 4011. As can be seen, the dashpot characteristics is provided as data train simulating characteristics of dashpot. In the dashpot the characteristics employed in the shown embodiment vary the throttle valve open angle from the initial throttle valve open angle to a given open angle $\theta_2'$ in stepwise fashion and subsequently decrease the throttle valve open angle to minimum open angle $\theta_0$ in a period $T_D$. After the throttle open angle becomes the minimum open angle $\theta_0$ by repeating the process at the steps 4011 and 4012, the process returns to the steady state control at the step 4009.

On the other hand, if the dashpot as checked at the step 4010 is not active, the modified throttle valve open angle $\theta_2$, the input/output speeds $N_1$ and $N_2$ at the input and output of the automatic power transmission are read out at a step 4010'. Then, a check is performed whether the modified throttle open angle $\theta_2$ is greater than the minimum open angle $\theta_0$, the input speed $N_1$ is greater than or equal to a predetermined fuel cut speed criterion $n_1$, and the output speed $N_2$ is greater than or equal to a predetermined fuel cut speed criterion $n_2$, at a step 4013. If an AND condition set in the step 4013 is not established, judgement can be made that a fuel cut-off condition is not satisfied. Therefore, the process returns to the steady state control at the step 4009. On the other hand, when an AND condition as checked at the step 4013 is established, a fuel cut-off state is simulated at a step 4014. Simulation of a fuel cut-off state is performed utilizing the output torque variation characteristics $\theta_0'$ in FIG. 12. Then, at steps [E]4015 and 4016, fuel resume condition is checked. In the shown process, fuel resuming condition is detected on the basis of the throttle valve open angle criterion $\theta_0'$ and the input speed criterion $n_1$ of the automatic power transmission. Also, a fuel resume condition may also be simulated by providing external fuel resumption command. Therefore, at the step 4015, the fuel resuming criteria are read out, or an external fuel resumption command is read. Then, at the step 4016, check is performed whether fuel resuming condition is satisfied. Namely, fuel resumption is determined when the modified throttle open angle $\theta_2$ is equal to the throttle valve open angle criterion $\theta_0'$ and the input speed $N_1$ is smaller than or equal to the input speed criterion $n_1$, or the fuel resumption command as the external signal is present, as checked at the step 4016. If fuel resumption is decided at the step 4016, process goes to the step 4009 to perform steady state control. Otherwise, process returns to the step 4014 to continue simulation of fuel cut-off state.

As can be appreciated, with the shown process, engine deceleration transition in various modes can be precisely simulated.

While the present invention has been discussed hereabove in terms of the preferred embodiment of the invention, the invention should be appreciated to be restricted for the shown embodiment. The invention can be embodied in various fashion. Therefore, the invention should be interpreted to include all possible embodiments and modifications which can be embodies without departing from the principle of the invention set out in the appended claims.

What is claimed is:

1. A simulation system for a specimen associated with an automotive internal combustion engine, comprising:
   a power plant which incorporates relatively a high inertia and means for compensating a high inertia for achieving a low inertia equivalent to the automotive internal combustion engine, said power plant being connected to an input axle of the specimen;

an engine characteristics generator receiving predetermined engine operation parameter simulated data for deriving a control signal to be output to the input axle of the specimen according to a predetermined engine output torque variation characteristic which is set in terms of said engine operation parameter simulated data; and means, cooperative with said engine characteristics generator and responsive to a torque variation command demanding said output torque from a first value to a second value, for determining a transient characteristic of the specimen according to the output torque value from said power plant and a torque derived at an output axle of the specimen.

2. A simulation system for an automotive internal combustion engine as set forth in claim 1, wherein said transit characteristic is variable depending upon simulated engine driving condition as defined by said predetermined engine operation parameter.

3. A simulation system for an automotive internal combustion engine as set forth in claim 1, further including torque variation characteristics setting means which sets the torque variation characteristic simulating a transition upon shifting of an automotive power transmission.

4. A simulation system for an automotive internal combustion engine as set forth in claim 3, wherein said torque variation characteristics setting means is active in response to initiation of shifting of the automotive power transmission.

5. A simulation system for an automotive internal combustion engine as set forth in claim 4, wherein said torque variation characteristics setting means detects shifting of the automotive power transmission based on variation of ratio of input/output revolution speed at the transmission.

6. A simulation system for an automotive internal combustion engine as set forth in claim 4, wherein said torque variation characteristics setting means detects satisfaction of a predetermined shift condition of the automotive power transmission and becomes active upon expiration of a given first period after detection of satisfaction of said shift condition and inactive after expiration of a given second period after detection of satisfaction of said shift condition.

7. A simulation system for an automotive internal combustion engine as set forth in claim 1, wherein said torque variation characteristics setting means varies torque variation characteristics depending upon active state and inactive state of idle-up.

8. A simulation system for an automotive internal combustion engine as set forth in claim 7, wherein said torque variation characteristics setting means detects satisfaction of a predetermined idle-up condition to switch torque variation characteristics from a first characteristics for idle-up inactive state to a second characteristics for idle-up active state.

9. A simulation system for an automotive internal combustion engine as set forth in claim 1, wherein said torque variation characteristics setting means is responsive to an acceleration and deceleration demand simulated data for setting torque variation characteristics for simulating torque variation during engine accelerating and decelerating transition.

10. A bench testing apparatus for a vehicular component associated with an automotive internal combustion engine, comprising:

a power plant which incorporates a relatively high inertia, and means for compensating a high inertia for achieving a low inertia equivalent to the automotive internal combustion engine, said power plant being drivingly connected to said vehicular component to be tested for supplying a driving torque;

an engine characteristics generator receiving predetermined engine operation parameter simulated data for deriving a control signal to be output to the input axle of the vehicular component according to a predetermined engine output torque variation characteristic which is set in terms of said engine operation parameter simulated data; and means, cooperative with said engine characteristics generator and responsive to a torque variation command demanding said output torque from a first value to a second value, for determining a transient characteristic of the vehicular component according to the output torque value from said power plant and a torque derived at an output axle of the specimen.

11. A bench testing apparatus as set forth in claim 10, wherein said torque variation characteristic is variable depending upon simulated engine driving condition as defined by said predetermined engine operation parameter.

12. A bench testing apparatus as set forth in claim 10, further including torque variation characteristics setting means which sets the torque variation characteristics simulating a transition upon shifting of an automotive power transmission.

13. A bench testing apparatus as set forth in claim 12, wherein said torque variation characteristics setting means is active in response to initiation of shifting of the automotive power transmission.

14. A bench testing apparatus as set forth in claim 13, wherein said torque variation characteristics setting means detects shifting of the automotive power transmission based on variation of ratio of input/output revolution speed at the transmission.

15. A bench testing apparatus as set forth in claim 13, wherein said torque variation characteristics setting means detects satisfaction of a predetermined shift condition of the automotive power transmission and becomes active upon expiration of a given first period after detection of satisfaction of said shift condition and inactive after expiration of a given second period after detection of satisfaction of said shift condition.

16. A bench testing apparatus as set forth in claim 10, wherein said torque variation characteristics setting means varies torque variation characteristics depending upon active state and inactive state of idle-up.

17. A bench testing apparatus as set forth in claim 16, wherein said torque variation characteristics setting means detects satisfaction of a predetermined idle-up condition to switch torque variation characteristics from a first characteristics for idle-up inactive state to a second characteristics for idle-up active state.

18. A bench testing apparatus as set forth in claim 10, wherein said torque variation characteristics setting means is responsive to an acceleration and deceleration demand simulated data for setting torque variation characteristics for simulating torque variation during engine accelerating and decelerating transition.

19. A simulation system of a vehicular internal combustion engine, the simulation system being associated with an automatic power transmission to be tested, comprising:

a low inertia drive unit having a low inertia force and substantially equivalent to the internal combustion engine characteristics, the low inertia driving unit being connected to an input axle of the automatic power transmission;

first means for detecting an revolution speed (N1) of an output axle of the low inertia driving unit;

second means for detecting a torque (T1) of the input axle of the automatic power transmission;

an engine characteristic generator for deriving a torque command according to the revolution speed (N1) and the torque of the input axle of the automatic power transmission;

third means for supplying a corrected torque command to the engine characteristic generator, the torque command derived therefrom being corrected from the torque command derived from the engine characteristic generator by adding or subtracting a corrective torque signal having an arbitrarily set quantity and having an arbitrary timing to or from the torque command; and drive absorbing means which simulates an output load of the automatic power transmission.

* * * * *